United States Patent
Bhaskaran (10) Patent No.: US 8,009,732 B2
(45) Date of Patent: Aug. 30, 2011

(54) IN-LOOP NOISE REDUCTION WITHIN AN ENCODER FRAMEWORK

(75) Inventor: Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 1398 days.

(21) Appl. No.: 11/469,699

(22) Filed: Sep. 1, 2006

(65) Prior Publication Data
US 2008/0056366 A1   Mar. 6, 2008

(51) Int. Cl.
*H04N 7/12* (2006.01)
(52) U.S. Cl. .......... 375/240.12; 375/240.27; 375/240.29
(58) Field of Classification Search ............ 375/240, 375/240.01, 240.12, 240.16, 240.27, 240.29; 348/699
See application file for complete search history.

(56) References Cited

U.S. PATENT DOCUMENTS

| | | | |
|---|---|---|---|
| 5,253,059 A | 10/1993 | Ansari et al. | |
| 5,327,242 A | 7/1994 | Naimpally et al. | |
| 5,361,105 A * | 11/1994 | Iu ................................... | 348/699 |
| 5,363,213 A | 11/1994 | Coward et al. | |
| 5,490,094 A | 2/1996 | Heimburger et al. | |
| 5,574,512 A | 11/1996 | Saeger | |
| 5,875,003 A | 2/1999 | Kato et al. | |
| 5,930,397 A | 7/1999 | Tsujii et al. | |
| 6,037,986 A | 3/2000 | Zhang et al. | |
| 6,269,123 B1 | 7/2001 | Fujishiro et al. | |
| 6,347,161 B1 | 2/2002 | Mancuso | |
| 6,356,592 B1 | 3/2002 | Naito | |
| 6,456,328 B1 | 9/2002 | Okada | |
| 6,657,676 B1 | 12/2003 | Borneo et al. | |
| 6,819,804 B2 | 11/2004 | Tenze et al. | |
| 7,173,971 B2 * | 2/2007 | Amara et al. ........... | 375/240.27 |
| 2001/0005400 A1 | 6/2001 | Tsujii et al. | |
| 2001/0019588 A1 | 9/2001 | Naito et al. | |
| 2001/0035969 A1 | 11/2001 | Kishimoto | |
| 2002/0054637 A1 | 5/2002 | Kato | |
| 2002/0094130 A1 | 7/2002 | Bruls et al. | |
| 2002/0101543 A1 | 8/2002 | Ojo et al. | |
| 2002/0150166 A1 | 10/2002 | Johnson | |
| 2002/0191858 A1 | 12/2002 | Sindhu | |
| 2004/0001546 A1 | 1/2004 | Tourapis et al. | |
| 2005/0074064 A1 * | 4/2005 | Lee et al. ................. | 375/240.16 |
| 2005/0175092 A1 | 8/2005 | Puri et al. | |
| 2006/0008038 A1 | 1/2006 | Song et al. | |
| 2006/0067405 A1 | 3/2006 | Hormis et al. | |

OTHER PUBLICATIONS

"H.264—The New Video Codec," (Clever Stuff BT Exact), IPR Overview: 42995 Issue: 1.1, Oct. 24, 2003.

Oten, R., et al., "Adaptive Alpha-Trimmed Mean Filters Under Deviations From Assumed Noise Model", IEEE Transactions on Image Processing, vol. 13, No. 5, May 2004, pp. 627-639.

Cocchia, S., et al., "Design and Real-Time Implementation of a 3-D Rational Filter for Edge Preserving Smoothing", IEEE Transactions on Consumer Electronics, vol. 43, No. 4, Nov. 1997, pp. 1291-1300.

(Continued)

*Primary Examiner* — Allen Wong (57) ABSTRACT

An apparatus and method are described for filtering noise internally within a video encoding framework. In various embodiments of the invention, an in-loop noise filter is integrated within an encoding device or framework that reduces noise along a motion trajectory within a digital video signal. This integration of in-loop noise reduction allows both noise filtering parameters and encoding parameters to be more easily related and adjusted. The in-loop noise filter leverages characteristics of digital video encoding processes to reduce noise on a video signal and improve encoding efficiencies of a codec.

19 Claims, 7 Drawing Sheets

OTHER PUBLICATIONS

Nuno Vasconcelos & Frederic Dufaux, "Pre and Post-Filtering for Low Bit-Rate Video Coding", Image Processing, 1997, Proceedings, International Conference on Oct. 26-29, 1997, pp. 291-294.

Hideaki Kimata, et al., "Edge Preserving Pre-Post Filtering for Low Bitrate Video Coding", Image Processing, 2001, Proceedings 2001 International Conference on Oct. 7-10, 2001, pp. 554-557.

* cited by examiner

IN-LOOP NOISE REDUCTION WITHIN AN ENCODER FRAMEWORK

REFERENCE TO RELATED APPLICATIONS

This application relates to U.S. patent application entitled, "Adaptive Video Prefilter," Ser. No. 10/666,668, filed on Sep. 19, 2003; and U.S. patent application entitled, "Spatio-Temporal Noise Filter for Digital Video," Ser. No. 11/261,042, filed on Oct. 28, 2005; both of which are herein incorporated by reference in their entirety.

BACKGROUND

A. Technical Field

The present invention relates generally to video processing, and more particularly, to an apparatus and method for in-loop noise reduction within a digital video encoder framework.

B. Background of the Invention

The importance of digital video technology in the current communications markets is well known. The ability to transmit increasing amounts of video data within a constrained bandwidth has allowed the display of video and image content on various devices and platforms. Recent technological advancements within the communications market have facilitated this improvement in the transmission and display of video and image data. One such example is the improvement in coding efficiencies provided by current codec devices and associated standards.

Video data may be encoded in order to reduce the amount of data redundancy that is transmitted within a corresponding digital signal. This reduction in redundant data effectively allows video data to be communicated using relatively less bandwidth. In determining how a video signal is to be encoded, oftentimes an analysis is required of both the video data and the communications medium on which the video data is to be transmitted. This analysis is performed in order to ensure that a preferred video or image quality is maintained on a display device.

The presence of noise within a video signal may adversely affect both the coding efficiency of a codec that is encoding the video signal and the quality of an image or video stream at a receiving display device. Noise may be generated and undesirably inserted into a signal from various internal and external sources. Two such examples of noise are Gaussian noise and impulse noise.

Gaussian noise is often characterized as a uniform distribution of energy having Gaussian distribution levels over a particular frequency spectrum. Gaussian noise may be generated, for example, as temperature increases in communication equipment and devices resulting in thermal noise that is generated and undesirably inserted into a signal. Comparatively, impulse noise is non-continuous noise pulses within the signal. These noise pulses are oftentimes short in duration and have relatively high amplitudes, and may be generated from both internal and external sources.

The presence of noise within a signal may be measured as a signal to noise ratio ("SNR"). As SNR decreases, the quality of a video signal degrades and adversely affects the ability of a display device to regenerate the particular video. This noise may be generated in various locations within a communication system, such as the system illustrated in FIG. 1.

Figure 1:
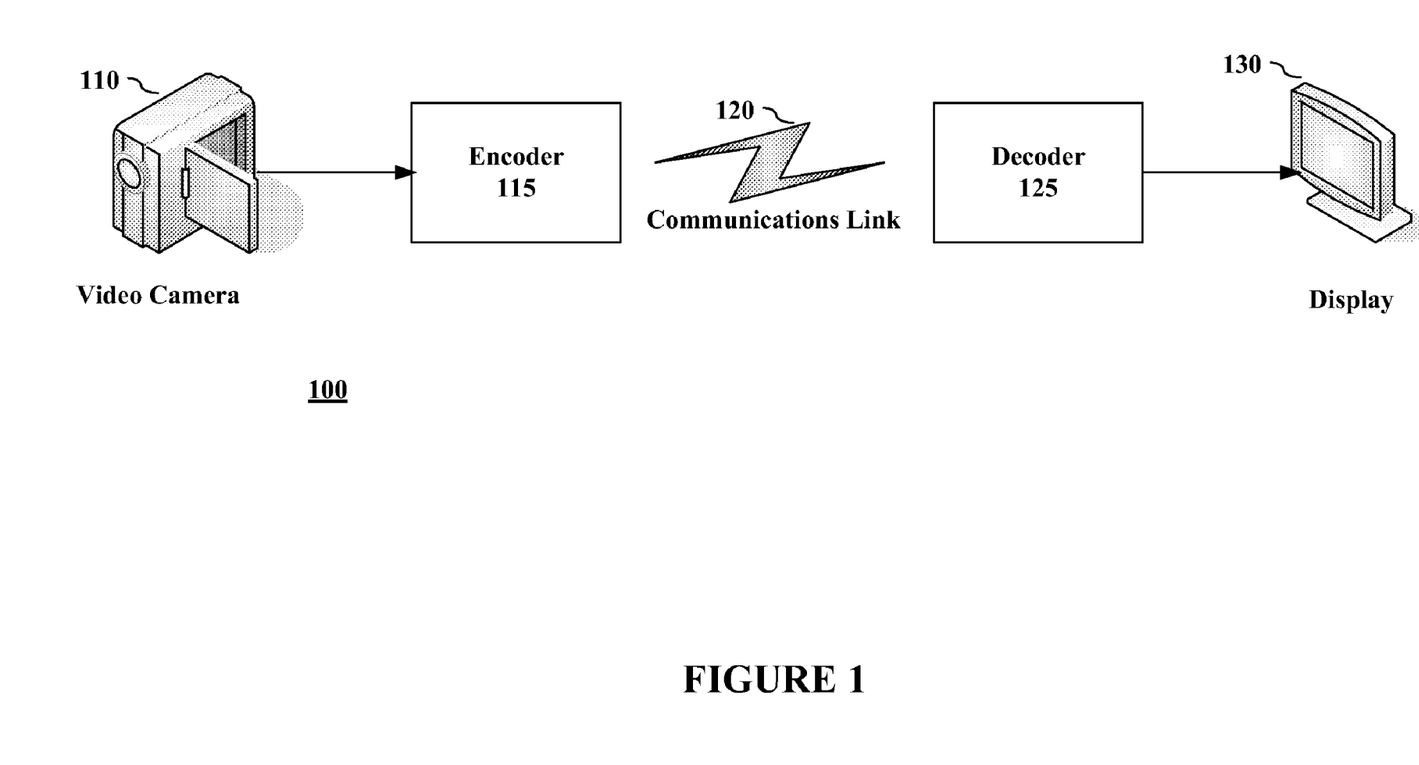
FIG. 1 is an illustration of a communication link on which video data may be transmitted and received.

As shown in this Figure, a video capture device, such as a video camera 110, generates a video signal which is sent to an encoder 115. This encoder 115 encodes the video signal, effectively compressing the signal to remove a level of data redundancy. This encoded signal is communicated via a communications link 120, which may be wired or wireless, to a receive-side decoder 125. The decoder 125 reconstructs the encoded video signal so that it may be shown on the display device 130.

The components within this system 100, as well as sources external to the system 100, may generate noise. The presence of noise within a video signal reduces the coding efficiency of the encoder 115 and results in unwanted noise being encoded within the video signal. Various types of noise filters are currently being used to reduce the amount of noise within a video signal including alpha trimmed filters and median filters. Pre-processing noise filters, such as those described in U.S. patent application Ser. Nos. 10/666,668 and 11/261,042, may be employed that remove noise from a video signal prior to the encoder.

These pre-processing filters typically require additional computing resources and may increase the overall complexity of a video coding system. Because these pre-process filters are not influenced by a codec's parameters, the associated filter functions may not be easily adapted based on the codec's settings. Furthermore, these filters often fail to address or leverage certain characteristics of digital video signals when filtering noise.

SUMMARY OF THE INVENTION

An apparatus and method are described for filtering noise internally within a video encoding framework. In various embodiments of the invention, an in-loop noise filter is integrated within an encoding device or framework that reduces noise along a motion trajectory within a digital video signal. This integration of in-loop noise reduction allows both noise filtering parameters and encoding parameters to be more easily related and adjusted. The in-loop noise filter leverages characteristics of digital video encoding processes to reduce noise on a video signal and improve encoding efficiencies of a codec.

In various embodiments of the invention, an in-loop noise reduction filter comprises a motion estimation module, an error calculation filtered block estimation module and a frame buffer. The in-loop filter leverages calculation performed by an encoder framework that identify an encoding mode for pixel blocks that are to be encoded. For example, previously performed motion vector calculations may be used to identify a motion trajectory, including motion vectors therein, on which pixel block intensity characteristics are used in the noise reduction process. The block intensity characteristics are analyzed according to various processes in order to reduce noise in a pixel block located on the motion trajectory.

One skilled in the art will recognize that numerous different types of calculations may be employed to quantify intensity relationships between related pixel blocks on one or more motion trajectories. In various embodiments of the invention, intensity differences are identified between these multiple pixel blocks and these intensity differences are applied to a plurality of thresholds. These thresholds can be used to tune the filtering processes and allow a user to adjust the parameters of the noise reduction filter. For example, the thresholds may be adjusted to more effectively reduce noise on a video signal having a significant amount of noise or provide a higher quality on an encoded video signal feed.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

An apparatus and method are described for filtering noise internally within a video encoding framework. In various embodiments of the invention, an in-loop noise filter is integrated within an encoding device or framework that reduces noise along a motion trajectory within a digital video signal. This integration of in-loop noise reduction allows both noise filtering parameters and encoding parameters to be more easily related and adjusted. The in-loop noise filter leverages characteristics of digital video encoding processes to reduce noise on a video signal and improve encoding efficiencies of a codec.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including computers, network servers, wireless devices and other communication devices. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 2:
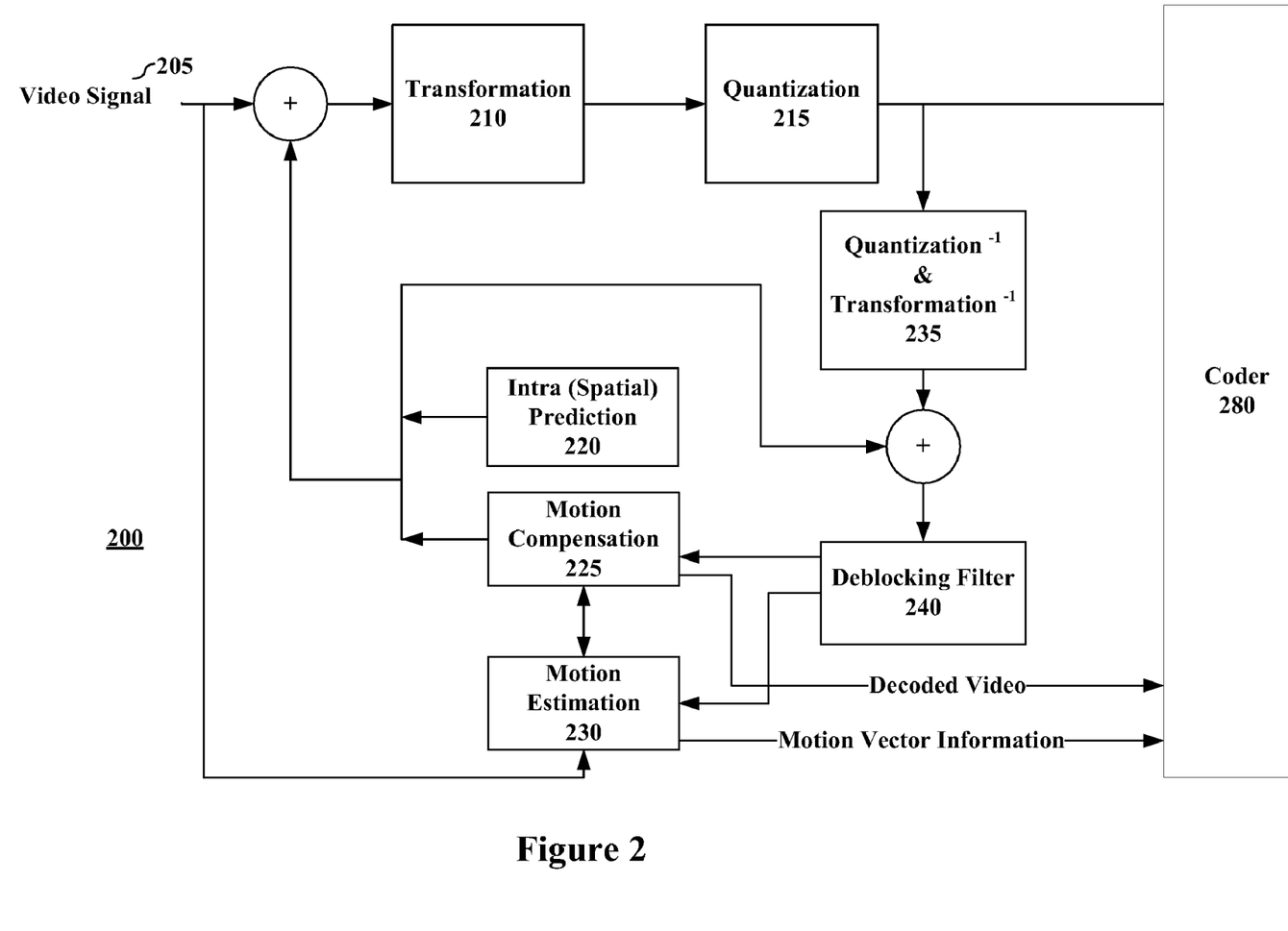
FIG. 2 is a representative block diagram of an AVC/H.264 encoding framework.

FIG. 2 illustrates an exemplary H.264 encoding framework in which an in-loop noise filter may be integrated. The encoding framework 200 receives a digital signal that is converted into the frequency domain by a transformation module 210 resulting and quantized by a quantization module 215. The resulting plurality of frequency coefficients are processed by a reverse quantization and transformation module 235, which effectively reconstructs the video blocks that had been previously transformed and quantized so that error introduced into the video signal by the encoding processing may be identified. A deblocking filter 240 is provided which helps prevent the blocking artifacts that are common to various DCT-type image compression techniques Each video block may be encoded using one of multiple different inter or intra prediction modes, each mode having associated error and efficiency characteristics. An intra (spatial) prediction module 220 analyzes intra mode efficiencies and identifies a potential prediction intra mode for a video block based on the coding efficiencies of the analyzed intra modes. A motion estimation module 230 identifies a reference block and a motion vector representative of a spatial displacement between a reference block and the block that is to be encoded in an inter mode. The reference block may be located within a single video reference frame or may be generated from multiple blocks within a reference frame or multiple reference frames. The motion vector may be part of a motion trajectory of the reference block across multiple video frames.

The motion compensation module 225 predicts a block from other previously decoded blocks in previous frames that may be used in an inter coding process. This prediction is done by identifying an error or distortion level associated with the reference block and motion vector relative to the particular block that is to be inter encoded. This error is encoded and provided to a receiving client so that the particular block may be reconstructed from the reference block and motion vector data. As described above, each inter mode will have an associated error value for the particular block. This error value is a significant component in the rate-distortion performance of each of the modes and is an important consideration in the selection of a single inter encoding mode for the particular block.

Once an encoding mode has been selected (either inter or intra mode), the block is encoded accordingly by a coder 280 and transmitted onto a communication link. This encoded data is used by a receive-side client to reconstruct the block and display it.

Figure 3:
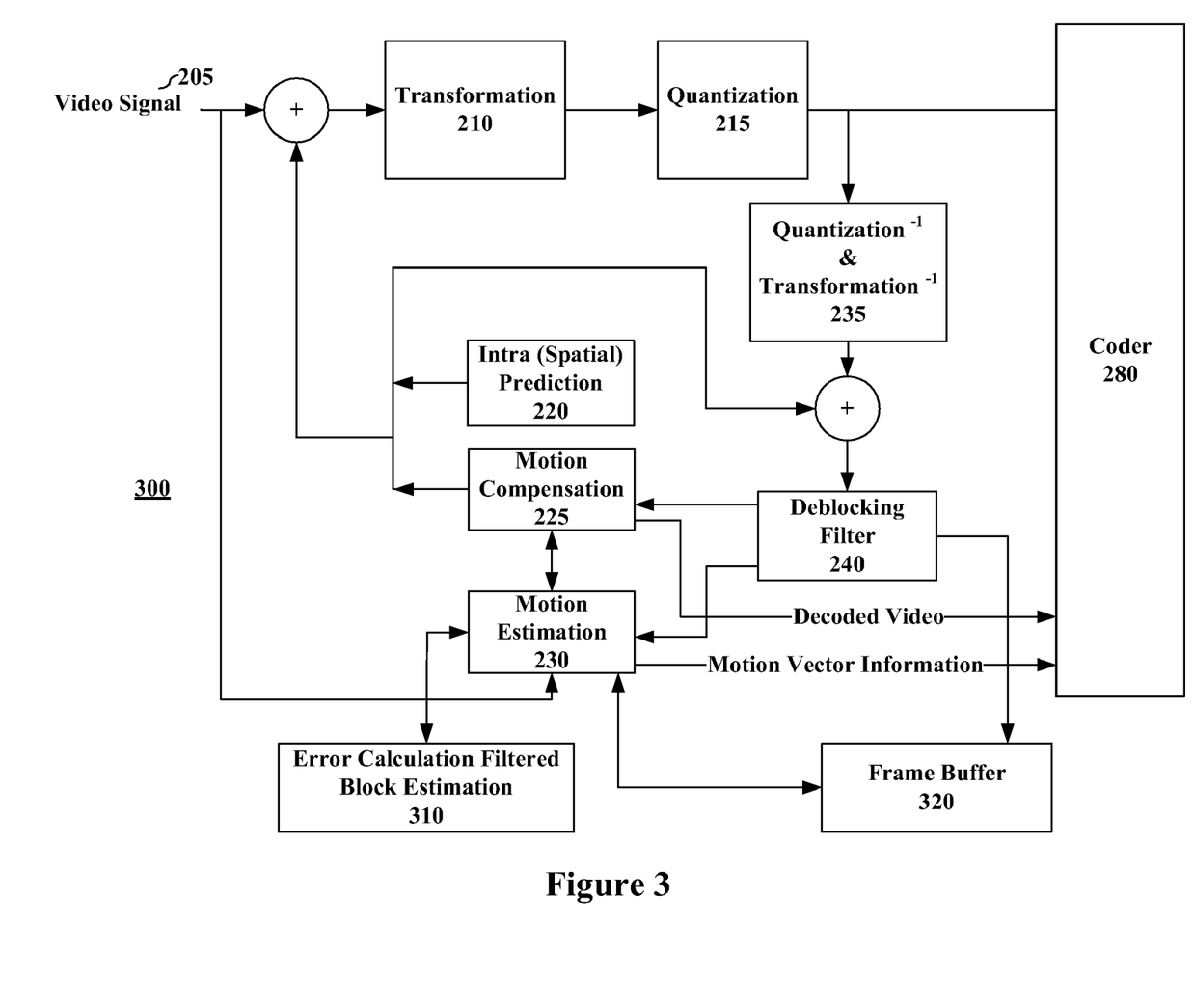
FIG. 3 is a block diagram of an encoding framework with in-loop noise reduction according to various embodiments of the invention.

FIG. 3 illustrates an encoding framework having an in-loop noise filter according to various embodiments of the invention. As previously discussed, the presence of noise within a video stream may significantly reduce the efficiency of an encoding framework 300. To reduce the amount of noise that is encoded into each video block, an error calculation filtered block estimation module 310 and frame buffer 320 are provided within the loop of the encoding framework. This in-loop filtering puts the noise reduction within the existing video coding dataflow and allows for a relatively easier association between encoding parameters and filtering parameters.

According to various embodiments of the invention, the filtered block estimation module 310 is communicatively coupled to the motion estimation module 230. The frame buffer 230 is also coupled to the motion estimation module 230. An in-loop noise reduction filter is realized through the motion estimation module 230, the filtered block estimation module 310, and the frame buffer 230. The frame buffer 230 stores frames within a video signal, which may include both preceding and succeeding frames relative to a frame that is being filtered. The filtered block estimation module 310 reduces noise on video blocks based on intensity characteristics of video blocks on one or more motion trajectories through multiple video frames. Motion vector calculations performed within the motion estimation module 230 are leveraged by the filtered block estimation module 310 so that the number of computations performed by the in-loop noise filter is reduced.

The in-loop noise reduction filter removes noise prior to encoding of the blocks with video frames. For example, noise generated from a video camera may be removed prior to the video signal being encoded. Because this filtering process reduces the amount of noise that would have otherwise been encoded by the coder 280, a relatively larger amount of the coder's bit budget is used to code the digital video signal.

B. Noise Reduction using Multiframe Motion Estimation

Figure 4:
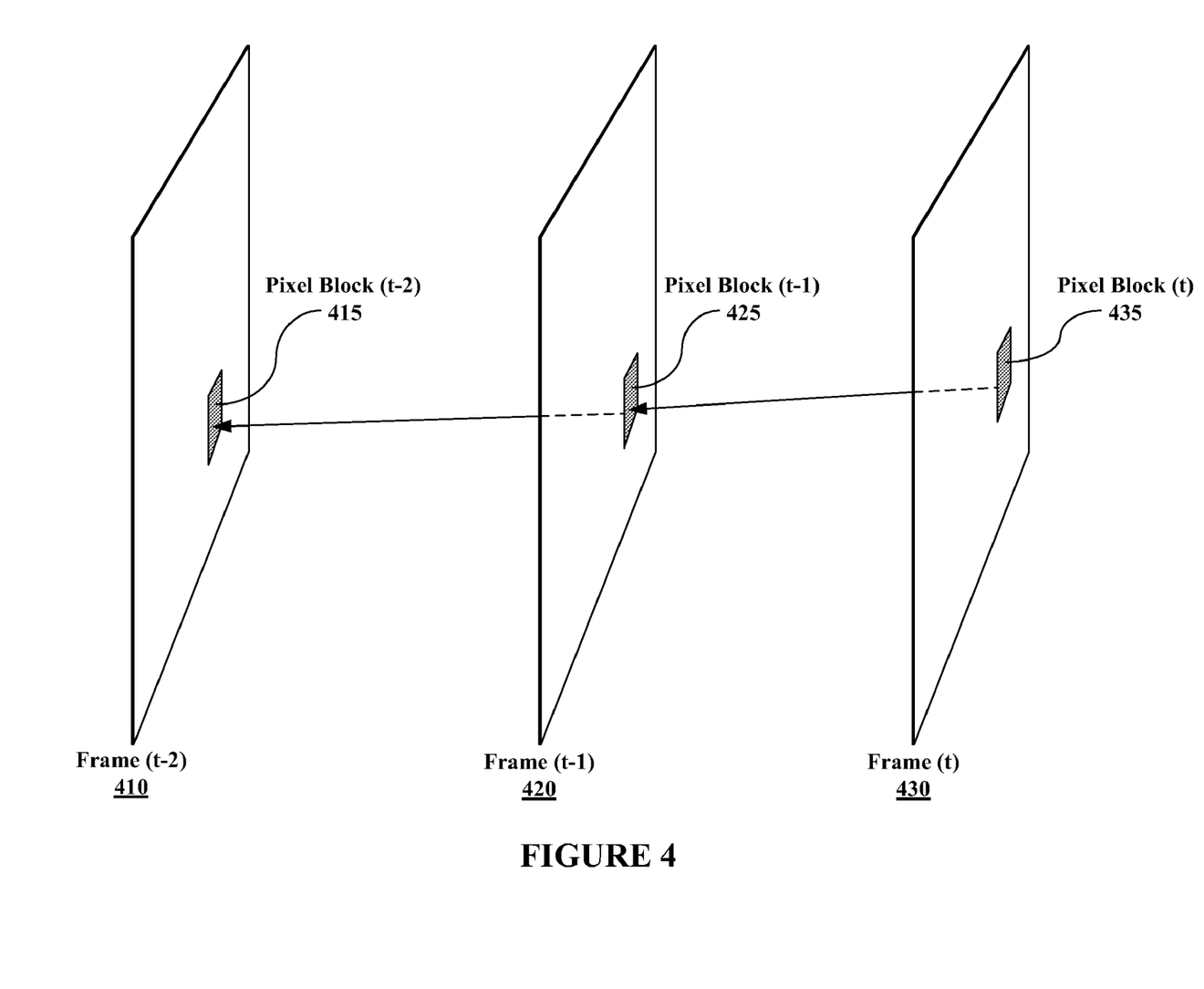
FIG. 4 is an illustration of multi-frame motion trajectory from a reference block across previous frames according to various embodiments of the invention.

In one embodiment of the invention, the noise reduction filter uses information from three temporally ordered consecutive frames. Referring to FIG. 4, a first frame, Frame (t) 430 has a Pixel Block (t) 435 that is processed to reduce any noise present therein prior to encoding. This noise reduction uses corresponding blocks along a motion trajectory across previous frames. The blocks may be in various sizes and shapes including 8×8 pixel blocks. As shown, these corresponding blocks comprise a second pixel block, Pixel Block (t−1) 425, in a contiguous previous frame, Frame (t−1) 420, and a third pixel block, Pixel Block (t−2) 415, in another previous frame, Frame (t−2) 410. This motion trajectory is defined by two motion vectors. The first motion vector between Pixel Block (t) 435 and Pixel Block (t−1) 425 may potentially have already been identified in motion estimation calculations by the motion estimation module 230. The second motion vector between Pixel Block (t−1) 425 and Pixel Block (t−2) 415 is identified by the error calculation filtered block estimation module 310. The complexity of identifying this second motion vector may be reduced by looking at neighboring motion vectors of Pixel Block (t−1) 425, previously identified by the motion estimation module 310, as a starting seed.

It may be assumed that all the three blocks 415, 425, 435 are corrupted with noise. However, there is low probability that collocated pixels in the three frames 410, 420, 430 are noise impaired because of the randomness of additive impulse noise. Using the relationship between the three blocks 415, 425, 435, defined by motion vectors, noise reduction on the first block 415 may be performed by analyzing the intensity characteristics of the second block 425 and the third block 435. In one embodiment of the invention, the preceding frames 410, 420 are stored within the frame buffer 320. One skilled in the art will recognize that numerous different techniques may be employed to identify motion vectors that define a motion trajectory across multiple video frames. Furthermore, as mentioned above, pre-existing encoding calculations may be leveraged to reduce the complexity of the noise reduction processes.

Figure 5:
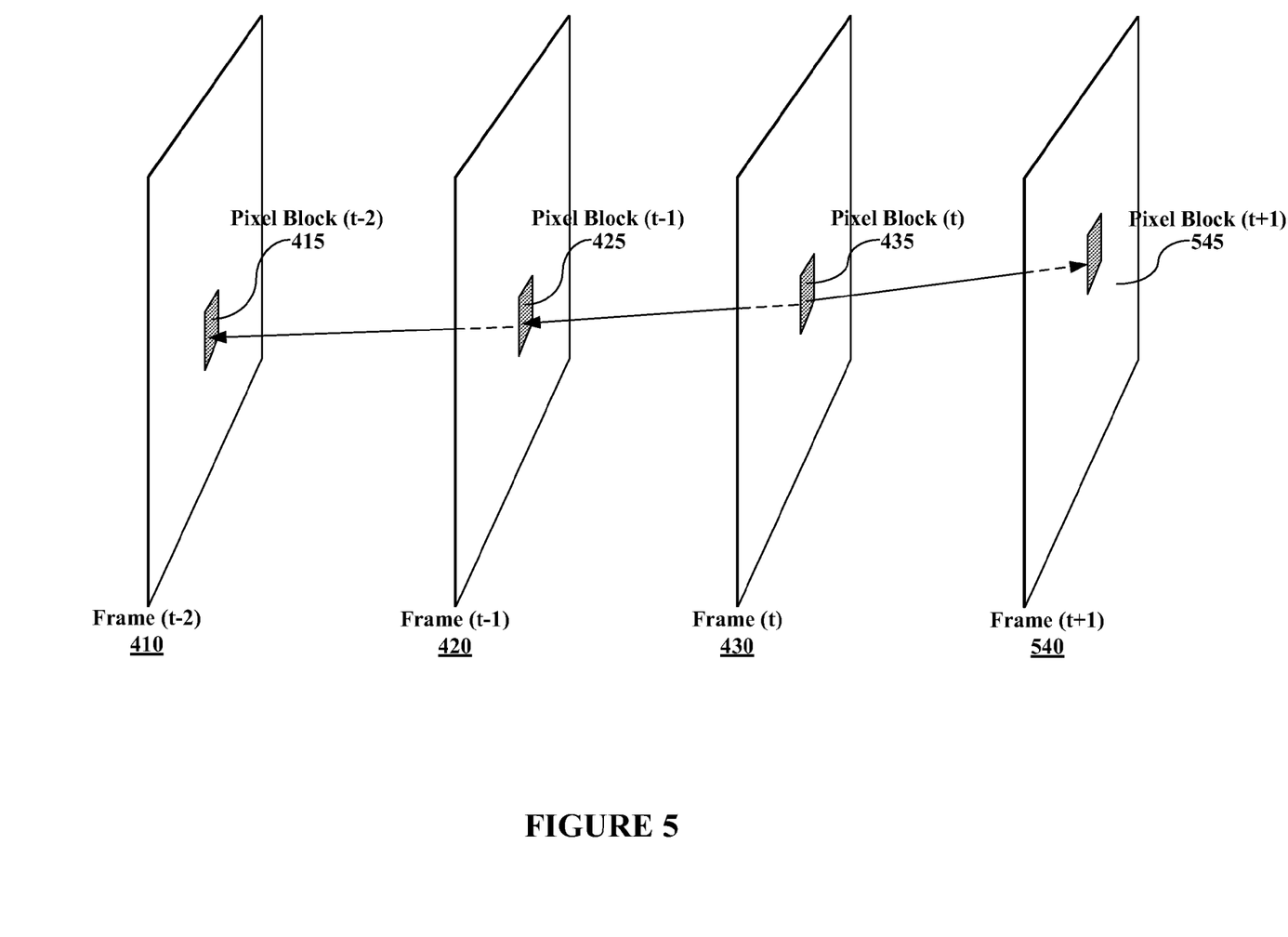
FIG. 5 is an illustration of multi-frame motion trajectory from a reference block across both previous and subsequent frames according to various embodiments of the invention.

In other embodiments of the invention, related video blocks may be used from both preceding and succeeding video frames relative to a frame that is being processed to reduce noise. FIG. 5 illustrates an exemplary motion trajectory defined across both preceding frames, Frame (t−1) 420 and Frame (t−2) 410, and a succeeding frame, Frame (t+1) 540, relative to the frame, Frame (t) 430, being analyzed to reduce noise therein. In this particular example, Pixel Block (t) 435 is analyzed relative to Pixel Block (t−1) 425 and Pixel Block (t−2) 415 that are on a motion trajectory in preceding frames and Pixel Block (t+1) 545 that is on a motion trajectory in a subsequent frame.

Various analysis techniques may be employed within the in-loop noise reduction filter that uses the intensity relationships between these pixel blocks. One skilled in the art will also recognize that multiple combinations of preceding and succeeding video frames, and pixel blocks therein, may be used including the two scenarios described above.

For exemplary purposes, certain embodiments of the invention are described in relation to FIG. 4 in which a noise reduction filter uses three temporally ordered consecutive frames and corresponding pixel blocks therein. According to various embodiments of the invention, a first intensity relationship between Pixel Block (t) 435 and Pixel Block (t−1) 425 is determined, and a second intensity relationship between Pixel Block (t−1) 425 and Pixel Block (t−2) 415 is determined. A first intensity factor may then be identified using the first intensity relationship and a second intensity factor may also be identified using the second intensity relationship. Based on these two intensity factors, an appropriate intensity value for the Pixel Block (t) 435 may be estimated that potentially reduces noise therein.

In one embodiment of the invention, the first intensity relationship ($R_1$) is defined as the difference between the intensity of Pixel Block (t) 435 and Pixel Block (t−1) 425 such that:

$$R_1 = \text{Pixel Block}(t) - \text{Pixel Block}(t-1)$$

The first intensity relationship ($R_1$) is applied to a first threshold level ($T_1$) in order to identify the value of the first intensity factor ($I_1$). In one embodiment of the invention, the first intensity factor ($I_1$) is defined as:

---

If $R_1 > T_1$ then $I_1$ = Pixel Block (t−1)
If $R_1 \leq -T_1$ then $I_1$ = Pixel Block (t)
If $-T_1 < R_1 \leq T_1$ then $I_1$ = (Pixel Block (t−1) + Pixel Block (t)) / 2

---

The second intensity relationship ($R_2$) is defined as the difference between the intensity of Pixel Block (t−1) 425 and Pixel Block (t−2) 415 such that:

$$R_2 = \text{Pixel Block}(t-1) - \text{Pixel Block}(t-2)$$

The second intensity relationship ($R_2$) is applied to a second threshold level ($T_2$) in order to identify the value of the second intensity factor ($I_2$). This second intensity factor ($I_2$) may be equal to or different from the first intensity factor ($I_1$). For example, the characteristics of the video signal may suggest that two different thresholds be applied to identify the first and second intensity factors. In one embodiment of the invention, the second intensity factor ($I_2$) is defined as:

---

If $R_2 > T_2$ then $I_2$ = Pixel Block (t−2)
If $R_2 \leq -T_2$ then $I_2$ = Pixel Block (t−1)
If $-T_2 < R_2 \leq T_2$ then $I_2$ = (Pixel Block (t−2) + Pixel Block (t−1)) / 2

---

An intensity value for Pixel Block (t) 435 is determined by analyzing the first and second intensity factors. In one embodiment of the invention, a third intensity factor ($I_3$) is dependent on the first intensity factor ($I_1$) and the second intensity factor ($I_2$), and is defined as:

$$I_3 = I_1 - I_2$$

The third intensity factor ($I_3$) is applied to a third threshold level ($T_3$) in order to identify the value of the intensity value for Pixel Block (t) 435. As was the case with the second threshold level ($T_2$), the third threshold level ($T_3$) may vary in its actual value depending on a number of factors including the characteristics of the video signal and the channel on which it is to be transmitted. For example, if the video signal has very little noise, then the three threshold values may be tuned to be more sensitive. Furthermore, the threshold values may be adjusted relative to a desired quality of the video signal. For example, if the required quality of the video being displayed on a receiving client is not high, then the thresholds may be tuned accordingly. In one embodiment of the invention, the intensity value for Pixel Block (t) 435 is defined as:

---

If $I_3 > T_3$ then Pixel Block (t) = $I_1$
If $I_3 \leq -T_3$ then Pixel Block (t) = $I_2$
If $-T_3 < I_3 \leq T_3$ then Pixel Block (t) = $(I_1 + I_2) / 2$

---

The resulting de-noised Pixel Block (t) 435 is filtered relative to intensity characteristics of other blocks in the corresponding motion trajectory. If the video frames 410, 420 and 430 are relatively noise free, then the Pixel Block (t) 435 remains unchanged by the noise reduction process.

The in-loop implementation of the error calculation filtered block estimation module 310 within the encoder framework allows certain calculations that are necessarily performed by other modules within the framework to be leveraged by the noise reduction process. The motion vector between Pixel Block (t) 435 and Pixel Block (t−1) 425 may have already been determined by the motion estimation module 230. Furthermore, the identification of the motion vector between Pixel Block (t−1) 425 and Pixel Block (t−2) 415 may be simplified by looking at neighboring motion vectors of Pixel Block (t−1) 425 as a starting seed. In addition, certain subtraction and compare functions used within the above-described embodiments may need to be performed during motion estimation calculations.

C. In-Loop Noise Reduction Method

Figure 6A:
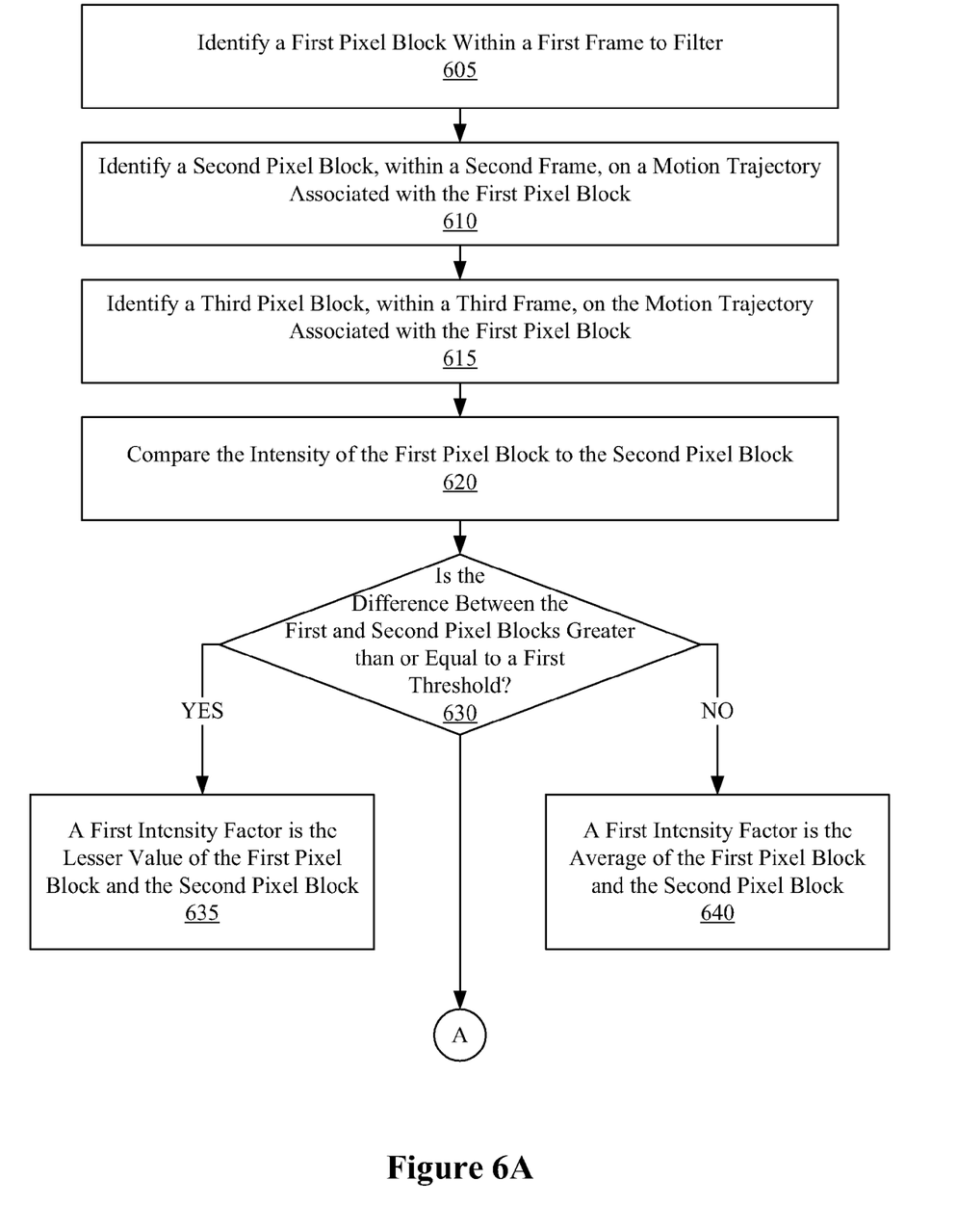
FIGS. 6A and 6B are flowcharts illustrating a method for in-loop noise reduction within a video encoder according to various embodiments of the invention.
Figure 6B:
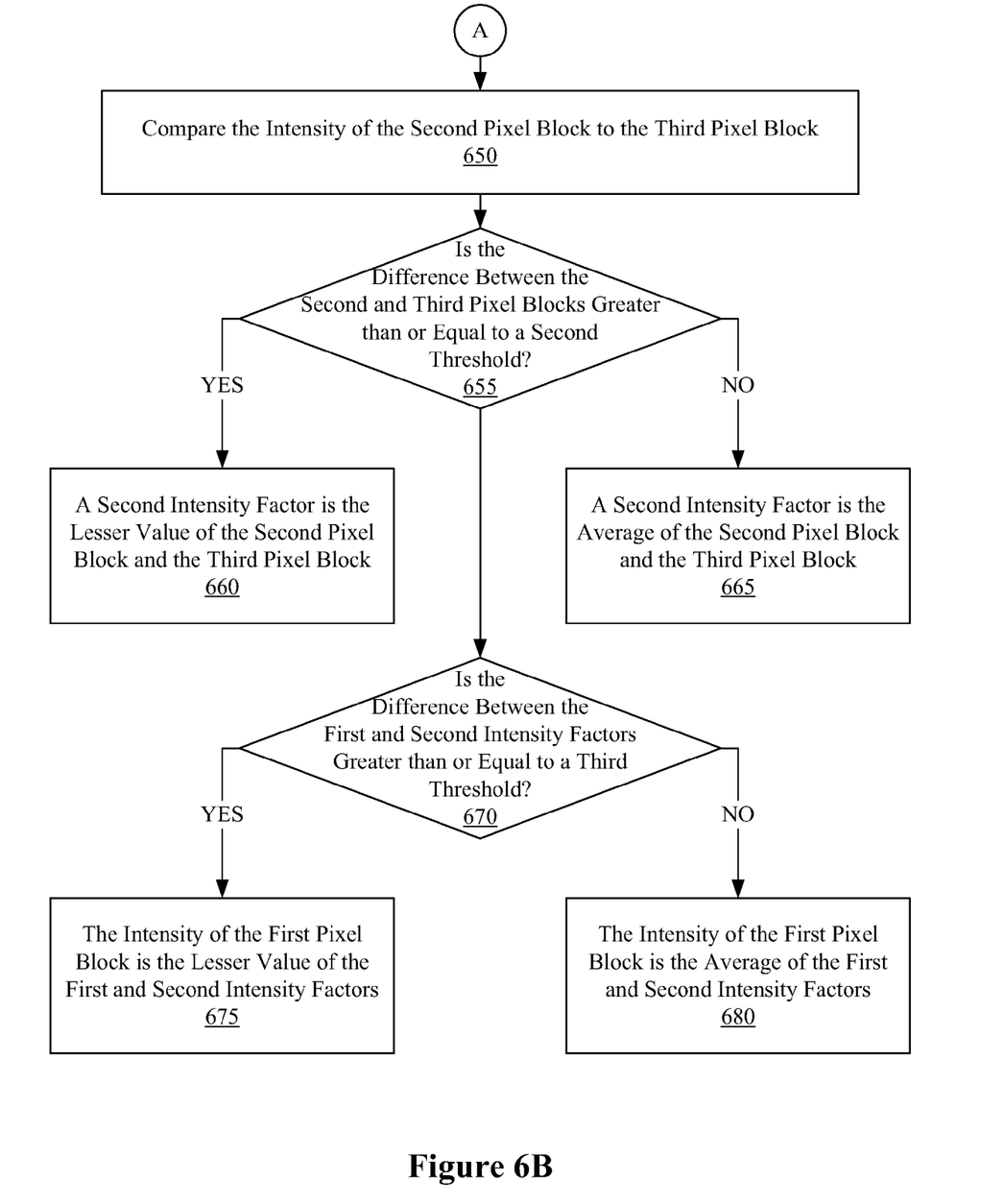

FIGS. 6A and 6B illustrate various embodiments of the invention, independent of structure, that reduce the amount of noise within a pixel block and associated motion trajectory across multiple video frames.

A first pixel block is identified 605 within a first frame in a sequence of video frames that are to be filtered to reduce noise. A second pixel block is identified 610 within a second frame and on a motion trajectory associated within the first pixel block. A third pixel block is identified 615 within a third frame and on the same motion trajectory of the first and second pixel blocks. The identification of the motion trajectory, and motion vectors therein, that enable the identification these pixel blocks may be performed using various techniques known within the art. It is important to note that the calculations associated with the identification of the pixel blocks, the motion trajectory and motion vectors are performed "in-loop" within an encoding framework.

The intensity of the first pixel block is compared 620 to the intensity of the second pixel block in order to identify a first intensity factor that relates to an intensity relationship between the first and second pixel blocks. In one embodiment of the invention, the intensity value of the second pixel block is subtracted 630 from the first pixel block. If the absolute difference is greater than (or equal to) a first threshold value, then the first intensity factor is equal to the lesser value of the first and second block intensity values 635. If the absolute difference is less than (or equal to) the first threshold value, then the first intensity factor is equal to the average of the first and second pixel block intensity values 640.

The intensity of the second pixel block is compared 650 to the intensity of the third pixel block in order to identify a second intensity factor that relates to an intensity relationship between the second and third pixel blocks. In one embodiment of the invention, the intensity value of the third pixel block is subtracted 655 from the second pixel block. If the absolute difference is greater than (or equal to) a second threshold value, then the second intensity factor is equal to the lesser value of the second and third block intensity values 660. If the absolute difference is less than (or equal to) the second threshold value, then the second intensity factor is equal to the average of the second and third pixel block intensity values 665.

Using the first and second intensity factors, an intensity value for the first pixel block is determined which may reduce noise previously present therein. In one embodiment of the invention, the second intensity factor is subtracted 670 from the first intensity factor. If the absolute difference is greater than (or equal to) a third threshold value, then the intensity value of the first pixel block is equal to the lesser value of the first and second intensity factors 675. If the absolute difference is less than (or equal to) the third threshold value, then the intensity value of the first pixel block is equal to the average of the first and second intensity factors 665.

As discussed above, the three threshold values may depend on the type of video, the transmission medium characteristics on which the video will be transmitted, the required display quality of the video, and other factors recognized by one skilled in the art. Also, the three threshold values may be the same or different depending on the design and requirements of the encoder framework in which the in-loop noise reduction method is realized.

One skilled in the art will recognize that the processes may be modified in which pixel block intensity characteristics along a motion trajectory are compared. In particular, the implemented calculations may be modified that generate intensity relationship values between these pixel blocks. Additionally, the particular pixel blocks that are used during the noise reduction method may be adjusted according to various factors including both the noise characteristics of the video signal, the characteristics of the medium on which the encoded video signal is to be communicated, and the desired quality of the video signal needed at the receive-side client.

While the present invention has been described with reference to certain exemplary embodiments, those skilled in the art will recognize that various modifications may be provided. Accordingly, the scope of the invention is to be limited only by the following claims.

I claim:

1. An encoder comprising:
   a video transformation and quantization module, coupled to receive a video signal, that transforms and quantizes a first video frame within the video signal;
   an inverse transformation and quantization module, coupled to the video compression module, that inversely transforms and inversely quantizes the first video frame;
   an in-loop filter, coupled within the encoder framework and to receive the video signal, that spatially and temporally filters a first block, within the first video frame, relative to a motion trajectory across a plurality of frames within the video signal; and
   a motion estimation module, coupled within the in-loop filter and to the inverse transformation and quantization module, that identifies a first motion vector in the motion trajectory,
   wherein the in-loop filter comprises an error calculation filtered block estimation module, coupled to the motion estimation module, that identifies (1) a first intensity factor based on a first intensity relationship between the first block and a second block located in a second frame within the plurality of frames, and located on the motion trajectory, (2) a second intensity factor based on a second intensity relationship between the second block and a third block in a third frame within the plurality of frames, and located on the motion trajectory, and (3) a denoised intensity value of the first block based on an analysis of the first and second intensity factors.

2. The encoder of claim 1 wherein the first block is an 8×8 pixel block that is encoded according to H.264.

3. The encoder of claim 1 wherein the in-loop filter comprises:
   a frame buffer, coupled to the motion estimation module, that stores the plurality of frames.

4. The encoder of claim 3 wherein the plurality of frames comprises at least one preceding frame to the first frame and at least one succeeding frame to the first frame.

5. The encoder of claim 3 wherein the plurality of frames comprises at least two preceding frames to the first frame.

6. The encoder of claim 1 wherein the first intensity relationship is the difference between an unfiltered intensity level of the first block and an unfiltered intensity level of the second block, and wherein the second intensity relationship is the difference between the unfiltered intensity level of the second block and an unfiltered intensity level of the third block.

7. The encoder of claim 1 wherein the denoised intensity value of the first block is identified by finding the difference between the first and second intensity factors.

8. The encoder of claim 1 wherein a first threshold is applied to the first relationship in order to identify the first intensity factor and a second threshold is applied to the second relationship in order to identify the second intensity factor.

9. The encoder of claim 8 wherein the first threshold is a different value than the second threshold.

10. The encoder of claim 8 wherein a third threshold is applied to the analysis of the first and second intensity factors in order to identify the denoised intensity value of the first block.

11. A method for in-loop noise reduction on a pixel block within a video frame, the method comprising:
   receiving a first pixel block within a first video frame at a codec input;
   identifying a first intensity factor based on a first relationship between the first pixel block and a second pixel block, within a second video frame, which is located on a motion trajectory associated with the first pixel block, and wherein a first motion vector between the first and second pixel blocks is used that had been previously generated by motion estimation calculations within the codec;
   identifying a second intensity factor based on a second relationship between the second pixel block and a third pixel block, within a third video frame, which is located on the motion trajectory; and
   comparing the first intensity relationship and the second intensity relationship to generate a denoised intensity value for the first pixel block.

12. The method of claim 11 wherein a first threshold is applied to the first relationship to identify the first intensity relationship and wherein the value of the first threshold may be adjusted.

13. The method of claim 11 wherein a second threshold is applied to the second relationship to identify the second intensity relation and wherein the value of the second threshold may be adjusted.

14. The method of claim 11 wherein a third threshold is applied to the comparison of the first and second intensity relationships to identify the denoised intensity value for the first pixel block.

15. A non-transitory computer readable medium having instructions for performing the method of claim 11.

16. A noise reduction assembly within an encoder comprising:
   a motion estimation module, coupled to receive a plurality of video frames, that identifies a motion vector between a first block in a first frame and a second block in a second frame;
   a frame buffer, coupled to the motion estimation module, that stores the plurality of video frames; and
   an error calculation filtered block estimation module, coupled to the motion estimation module, that reduces noise on the first block by identifying a motion trajectory associated with the first block, the second block and a third block, and identifying (1) a first intensity factor based on a first intensity relationship between the first block and a second block located in the second frame within the plurality of frames, and located on the motion trajectory, (2) a second intensity factor based on a second intensity relationship between the second block and a third block in a third frame within the plurality of frames, and located on the motion trajectory, and (3) a denoised intensity value of the first block based on an analysis of the first and second intensity factors.

17. The noise reduction assembly of claim 16 wherein the encoder framework operates in accordance with H.264.

18. The noise reduction assembly of claim 16 wherein the error calculation filtered block estimation module applies a plurality of tunable thresholds to a plurality of intensity relationships between blocks located on the motion trajectory.

19. The noise reduction assembly of claim 18 wherein the plurality of intensity relationships includes at least one intensity relationship of a block located on a subsequent frame of the first frame and another block, located on another frame, located on the motion trajectory.

* * * * *